United States Patent
Gonzalez et al.

(10) Patent No.: US 7,016,085 B2
(45) Date of Patent: Mar. 21, 2006

(54) REMOTE PROOFING SERVICE ADAPTIVELY ISOLATED FROM THE INTERNET

(75) Inventors: Manuel Gonzalez, Barcelona (ES); Andrew Mackenzie, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 184 days.

(21) Appl. No.: 10/176,563

(22) Filed: Jun. 21, 2002

(65) Prior Publication Data
US 2003/0147108 A1 Aug. 7, 2003

Related U.S. Application Data

(60) Provisional application No. 60/316,945, filed on Aug. 31, 2001.

(51) Int. Cl.
*H04N 1/00* (2006.01)
*H04M 11/00* (2006.01)

(52) U.S. Cl. ............... 358/405; 358/406; 358/1.15; 379/100.01

(58) Field of Classification Search ........... 358/400, 358/405, 406, 407, 468, 1.15; 379/100.01, 379/100.05, 100.12, 100.17
See application file for complete search history.

(56) References Cited

U.S. PATENT DOCUMENTS

| 5,995,719 | A * | 11/1999 | Bourdead'hui et al. ..... 358/1.12 |
| 6,253,234 | B1 * | 6/2001 | Hunt et al. ................ 709/213 |
| 6,449,645 | B1 * | 9/2002 | Nash ...................... 709/224 |
| 6,611,928 | B1 * | 8/2003 | Fujiyoshi et al. .......... 714/715 |
| 2002/0141380 | A1 * | 10/2002 | Koguchi ................... 370/351 |
| 2003/0147108 | A1 * | 8/2003 | Gonzalez et al. ........... 358/504 |

FOREIGN PATENT DOCUMENTS

| JP | 58163067 | * | 9/1983 |
| JP | 11009726 | * | 1/1999 |
| JP | 1112717 | * | 5/1999 |

* cited by examiner

Primary Examiner—Jerome Grant, II
(74) Attorney, Agent, or Firm—Peter I. Lippman (57) ABSTRACT

Automatic testing determines whether a proofing-file generator and receiver are in a common intranet. If so then the proofing file is automatically sent by a route that is substantially wholly within the intranet, and ideally peer-to-peer. If the generator and receiver are not in a common intranet, then preferably the file is sent by a conventional route through the Internet, preferably via a master server of the proofing service. The test preferably includes dynamically establishing IP addresses for the generator and receiver, and comparing the established IP addresses; however, consultation of a pretabulated listing is also possible.

41 Claims, 5 Drawing Sheets

REMOTE PROOFING SERVICE ADAPTIVELY ISOLATED FROM THE INTERNET

RELATED PATENT DOCUMENTS

Closely related documents are other, coowned U.S. utility-patent applications filed in the United States patent and Trademark Office—and hereby incorporated by reference in their entirety into this document. One is in the names of Jodra et al., Ser. No. 09/832,638, later issued as U.S. Pat. No. 6,607,258.

Second through fourth such related documents, all three still pending, are: one in the names of Vilanova et al., Ser. No. 09/945,492; another in the names of Soler et al., Ser. No. 09/919,260—together with references cited therein; and yet another in the names of Subirada et al., Ser. No. 09/919,207.

Fifth through seventh related documents are copending U.S. provisional applications of Such et al., Ser. Nos. 60/294,925 and 60/316,945, and a companion document to the present one, entitled "OPEN COVENTURING IN A REMOTE HARD-COPY PROOFING SERVICE, WITH PRESERVED CLIENTELE, THROUGH INTERFACE SHARING"—all three now consolidated as pending application Ser. No. 10/124,667.

Also potentially of interest and wholly incorporated by reference are U.S. Pat. Nos. 6,043,909 and 6,157,735 of Richard A. Holub.

FIELD OF THE INVENTION

This invention relates generally to machines and procedures for operation of a remote proofing service; and more particularly to operation of such a service with minimal use of the Internet and other generally available networks.

BACKGROUND OF THE INVENTION (a) Conventional remote proofing operation—Development of a remote proofing e-service, including but not limited to a remote hardcopy proofing service ("RHCPS"), includes as a core piece the transmission of files between users via the Internet. This characteristic is all but required, since nearly all vendors and customers have access to the Internet and wish to transact proofing business by that medium.

As discussed extensively in the companion patent document (docket 'Z151) of Such, many users will prefer to use private-network application service providers ("ASPs") instead, for all or part of the transmission route. In the present document, a network ASP is sometimes called a "generally available network" to make clear that this sort of network service is available for hire, i.e. for a fee, to most or all corners in general.

Some net-ASPs may restrict their clientele in one way or another—for instance, to only entities involved in the graphic-arts industry (including customers), or only large businesses, or only entities in certain geographical areas where the related equipment infrastructure is in place. Nevertheless for present purposes these ASPs are regarded as available "generally", which is to say available with some exceptions.

Accordingly in this document use of a commercial private-net ASP for all or part of the transmission route is treated as an equivalent to, and as a variant of, the more common use of the Internet. Every known commercial RHCPS, and remote soft-proofing service as well, operates through the Internet or a net-ASP equivalent/variant, or in some cases both. For instance this scheme was used in the recently discontinued commercial remote-proofing service known as "Vío"—in which even two users in a single common office exchanged proofing files via the Vío Internet servers.

In Holub '909 it is also speculated that a remote proofing service might operate through a local-area network, ("LAN"—see e.g. column 11, lines 62 and following, and later discussion of FIG. 21B) rather than the Internet or any other wide-area network ("WAN"). It does not appear that Holub's conceptual presentation offers an enabling disclosure of necessary details for actually installing such a service using a LAN.

Study of his drawing and discussions, however, reveals that the envisioned process of establishing network routing is manual and static. In addition, he devotes little attention to the particular characteristics of transmission through the Internet or equivalents/variants.

Furthermore Holub focuses exclusively upon interconnecting all the different "nodes" (participants) through "a" network, i.e. a single, unitary network, and is mainly interested in the colorimetrics and mechanics of inter-calibrating the printer devices at the several nodes. He thus refrains from proposing any specific criteria for his operator's manual configuring of node interconnections.

(b) Limitations in conventional remote proofing services—Many proofing files contain confidential information. Industrial espionage is a reality, making it important to minimize exposure of these files to competitors.

The Internet, however, is notorious for its open, decentralized character—which indeed, was a principal objective of those who conceptualized it at the outset. Anyone who wishes to intercept and eavesdrop on communications through the Internet can easily, and without detection by sender or intended recipient, divert a duplicate copy of any file in transit.

For sophisticated personnel who wish to take the time and trouble to avoid such exposure, strong-key encryption is an excellent preventative. While it cannot absolutely prevent a skilled hacker from gaining access to intelligence in proofing files, it can impose enormous burdens of time (e.g. months or years) and other resources—thereby making such efforts substantially noneconomic.

Encryption, however, even when set up to be performed automatically is often a stumbling block to smooth operations. Different computers, operating systems and personnel have highly varying degrees of success in implementing encryption; and it can be particularly troublesome in a multicornered communication among e.g. The central service, prepress, printshop, graphic artist, soft-proofing ASP and primary customer.

Private-net ASPs, mentioned above, may be somewhat less vulnerable to such interference, but generally speaking the principles of operation are the same. Any customer or illicit tapper on the network can collect all or selected traffic.

In addition some private-network service extends over only part of transmission routes for a particular customer, leaving some segment of an overall route still passing albeit briefly through the Internet—and a chain is still only as strong as the weakest link. For example in a four-cornered collaboration if only one of the participants (e.g. a graphic artist) relies on the Internet, then all of the presumed security enhancement provided by a net-ASP for the other three participants can fail.

Private networks also represent an added expense. This is particularly true for a private net that actually installs a hardware node in a user's facilities rather than relying upon a telephonic or short-Internet-segment intermediary connection. As pointed out above, even an installed hardware node may not wholly prevent intrusion.

In addition to security, another main goal in establishing a fully effective remote proofing service is rapid and reliable transmission. The Internet, and to a much lesser extent private networks, are susceptible to service slowdowns and even stoppages—as well as unreliability in reporting failure. Many factors can trigger such events, ranging from major public emergencies, down through weather-related equipment failure, to regular daily local overloads at routine peak periods (for instance, early evenings).

The Internet technology is particularly efficient and valuable by virtue of its robustness: the Transmission Control Protocol and Internet Protocol (TCP/IP) software are extremely general and extraordinarily fault-tolerant. On the other hand, because the Internet was designed to continue operating even when a particular node or many nodes have failed, such failures often go undetected and uncorrected for extended time periods.

This phenomenon can be particularly troublesome in event of local overloads in the system, when there is no place for incoming packets to go in an overloaded region. In such cases a sending server is expected to retain responsibility for the transmission by continuing to resend until all packets are acknowledged.

If, however, any such server along the way acknowledges what it has received but fails to complete its relay tasks, then packets can be simply lost. Therefore reliance upon the Internet and its equivalents or variants introduces erratic proofing-service behavior as to transmission time, and even complete disappearance of occasional transmissions.

(c) Other known data-transfer technologies—One conventional network structure or mechanism for moving data, namely a LAN, has not generally heretofore been associated with any commercial remote hardcopy proofing service. An exception is Holub's very limited speculation about static, manual routing through a single unitary network as mentioned above.

A LAN is not ordinarily a "generally available" network as previously defined, but rather is usually all owned by a single entity (business, family etc.) and preserved for use by people who are part of that entity. LANs commonly are connected to the Internet or another generally available network, but partly protected—from some more-threatening phenomena on the Internet—by a so-called "firewall", or equivalent.

A firewall is a system designed to prevent unauthorized access to or from a private network. Firewalls can be implemented in both hardware and software, or a combination of both.

Firewalls are frequently used to prevent unauthorized Internet users from accessing private networks—especially intranets—connected to the Internet. All messages entering or leaving the intranet pass through the firewall, which examines each message and blocks those that do not meet specified security criteria.

LANs ordinarily do not work on a website model but rather on the model of a single computer that is essentially extended to an intimate cluster of such computers. Therefore the way in which each computer in a LAN gives access to each other computer in the same LAN is typically through the same sort of user interface as employed for access within a single computer.

More specifically, access is commonly either:
via a DOS-like or Unix-like console application requiring syntactically correct command entries; or
via a "Windows® Explorer" graphical user interface, i.e. a graphical tabulation with drag-and-drop capability.

In either of these main interface types, the files in all the computers are presented essentially as if they were in a single computer with numerous hard-disc storage devices.

Commercial proofing-service operations, in contrast, conventionally operate on a website model—in other words, using HTML-driven displays, data-entry options and so forth; and with hyperlinks presented in the now-customary Internet style. Therefore operation of a proofing service over a LAN as such, although probably possible, would be a departure from the prior art.

Another conventional network type is sometimes called an "intranet". This mechanism or structure encompasses LANs, and in fact may actually include many LANs.

Like a LAN, an intranet is not a "generally available network" but rather usually owned by, and strictly for use of employees in, a single business entity. An intranet also is usually isolated by firewalls from the Internet and other generally available networks.

An intranet is a network based on TCP/IP protocols (an Internet) belonging to an organization, usually a corporation, accessible only by the organization's members, employees, or others with authorization. An intranet's websites look and act just like any other websites, but the firewall surrounding an intranet fends off unauthorized access.

Like the Internet itself, intranets are used to share information. Secure intranets are now the fastest-growing segment of the network field, because they are much less expensive to build and manage than private networks based on proprietary protocols.

An intranet may differ from a LAN by being far greater in scope and geographical extent. For instance an entity may have plural or multiple widely separated facilities, even situated in different cities or on different continents, and these may be interconnected by proprietary (owned or leased) network conduits—whether telephone leaselines or optical fibers—to form an intranet.

Such an intranet is typically set up with its own internal e-mail system, and with practically any features that the owner entity has its technicians build in; however, by far the most popular way to configure an intranet is through use of the same TCP/IP models used in the Internet. As noted earlier, intranets have not previously been associated with operation of a remote hardcopy proofing service, but it is probably very common for one or another participant in such a proofing service to be operating within an intranet.

Certain other observations regarding conventional use of an intranet are regarded as insights of the present inventors, rather than being generally recognized; and hence are not presented here. They are considered part of the inventive act and appear in the following section of this document.

(d) Conclusion—The foregoing discussion shows that problems of security, transmission time and reliability continue to impede achievement of uniformly excellent proofing-service operations. Therefore important aspects of the technology and business practices used in the field of the invention remain amenable to useful refinement.

SUMMARY OF THE DISCLOSURE

The present invention introduces such refinement. In its preferred embodiments, the invention has several aspects or facets that can be used independently, although they are preferably employed together to optimize their benefits.

Before introducing these aspects, this section begins with a preliminary, informal discussion of some realizations that may be regarded as part of the inventive process. These realizations will then be connected, still informally, with some principles underlying the invention.

Nowadays many software systems and methods provide for transmission of files between two nodes, or among multiple nodes, using the Internet. Such technology is particularly efficient and valuable by virtue of its generality and robustness: the TCP/IP software and its variants or equivalents are extremely general and extraordinarily fault-tolerant as noted above.

For present purposes, however, it is especially interesting that conventional TCP/IP fails to distinguish between transmissions passing wholly within the Internet, or wholly within intranets—or routed partly in the Internet and partly through intranets. Ordinary operation directs little or no attention to such distinctions.

This is not to say that the system is incapable of distinguishing—only that ordinarily it does not do so. The whole point of the standardized protocols is that they are ready for use by everyone with no need to introduce any sort of customization.

Thus a particular data packet can go from sender to receiver by any available route, without regard to its passage into or out from one or more intranets, or the Internet itself, along the way. That is what happens if a remote proofing service simply uses standard TCP/IP.

This standard operation leaves a remote proofing service needlessly vulnerable to the slowdowns, stoppages, and packet losses that characterize the Internet as summarized earlier. Although intranets, too, most commonly use TCP/IP, the vulnerabilities suffered on the Internet can be very greatly mitigated in an intranet.

Such mitigation results from several advantages of an intranet:

being privately owned and operated for the consistent business use of a particular organization, it is far less susceptible to overloads;

since an intranet represents a relatively very small, well-defined and restricted hardware assembly—as compared with the Internet—it is far more natural and feasible for the operators to maintain close monitoring of all its elements, and to watch carefully over performance of all those elements; and if something does go wrong, a user can ordinarily contact system operators personally and obtain quick, effective correction—since the possible routing options are fewer, while all the equipment along the way is very well known and largely accessible.

All these advantages unfortunately tend to evaporate when part of a transmission is routed outside an intranet via the Internet, and as mentioned above the standard protocols—particularly those conventionally employed in a commercial proofing service—simply fail to distinguish such operation from transmissions wholly within an intranet.

Remote-proofing-service users would benefit from transmission of files wholly within an intranet when possible—but conventional remote-proofing transmission practices do not differentiate between situations in which such transmission is possible and situations in which it is not. These conventional methods always use the same technique for file and information transmission: namely, the essentially willy-nilly sending of data through whatever channels and nodes happen to be available.

Unfortunately this method is only optimal for users who are not in a common intranet—that is, users who either (1) are not in any intranet, or (2) are in two separate intranets. This method is particularly adverse because it often causes two users in the same intranet to communicate through the external Internet. They therefore needlessly suffer the slower, less reliable and less secure service that arises when the information flows beyond their firewall.

Therefore the present invention undertakes to supply that usually-missing distinction, for remote proofing service. That is, the invention calls for analysis of transmissions to determine whether they can be carried out entirely within an intranet—and if so proceeds to carry them out in exactly that way.

As mentioned earlier, some speculation appears in the art as to use of LANs for remote proofing services; and the hints offered in the art appear to militate toward static, manual setup of connections. Of course such configurations would most naturally be along the lines of either a directory-listing model or a console-application (DOS/Unix) model, rather than a website model.

While the present invention does not necessarily depend for its novelty upon dynamic routing, such routing is within the scope of the invention and very easily put into effect, and can greatly enhance the more-general benefits of the invention. Such routing furthermore is readily set up automatically, without the sort of user manual intervention suggested in the art. Also within the scope of the invention and thus further distancing the invention from the art—though not strictly required for certain benefits of the invention—is use of a website model for presentation of data and interaction among participants.

With these preliminary, informal comments in mind, this presentation will now proceed to a perhaps more rigorous introduction or definition of the primary independent facets or aspects mentioned above. Again, these aspects are advantageously but not necessarily employed in combination.

In preferred embodiments of a first of its facets or aspects, the invention is a proofing method. It includes the step of automatically testing whether a proofing-file generator and receiver are in a common intranet. It also includes, if so (in other words, if they are in a common intranet), the step of automatically sending a proofing file substantially wholly within the intranet.

The foregoing may represent a description or definition of the first aspect or facet of the invention in its broadest or most general form. Even as couched in these very broad terms, however, it can be seen that this facet of the invention importantly advances the art.

In particular, this facet prevents the needless loss of speed, reliability and security incurred in the conventional, prior-art case by users who are in a common intranet but whose transfers are—or may be—routed in part outside that intranet. The computational overhead required to perform the test is entirely trivial relative to these benefits.

Although the first major aspect of the invention thus significantly advances the art, nevertheless to optimize enjoyment of its benefits preferably the invention is practiced in conjunction with certain additional features or characteristics. In particular, preferably the first aspect of the invention is combined with features of the other aspects introduced below.

In preferred embodiments of its second major independent facet or aspect, the present invention is proofing software. It includes a routine for testing whether a proofing-file generator and receiver are in a common intranet It also includes a routine, responsive to positive results of the testing, for transmitting a proofing file substantially wholly through the intranet. The foregoing may represent a description or definition of the second aspect or facet of the invention in its broadest or most general form.

Even as couched in these broad terms, however, it can be seen that this facet of the invention importantly advances the art. In particular, this software provides the mechanism by which the first (method) aspect of the invention functions to obtain the improved operation described.

Although the second major aspect of the invention thus significantly advances the art, nevertheless to optimize enjoyment of its benefits preferably the invention is practiced in conjunction with certain additional features or characteristics. In particular, preferably the transmission routine is peer-to-peer, and at least the peer-to-peer transmission routine is loaded into the generator or receiver, or both, before operation of the test routine.

The phrase "peer-to-peer" connotes that the transmission passes through no master server. Especially to the point, file transfers pass through no such server (such as the remote-proofing-service server) that is accessible only through the Internet. Ideally the routine is loaded into the generator or receiver, or both, at a factory which prepares the generator or receiver for an end-user.

In preferred embodiments of its third major independent facet or aspect, the invention is a device for use in remote proofing. It includes a software routine forming data used in testing whether a proofing-file generator and receiver are in a common intranet.

It also includes a stored telecommunications software routine, responsive to positive results of said testing, for transmitting or receiving a proofing file substantially wholly through the intranet.

The foregoing may represent a description or definition of the third aspect or facet of the invention in its broadest or most general form. Even as couched in these broad terms, however, it can be seen that this facet of the invention importantly advances the art.

In particular, this is a device—as sold, for instance, to end-users—for performing the beneficial method described in the above-introduced first facet of the invention. Although the third major aspect of the invention thus significantly advances the art, nevertheless to optimize enjoyment of its benefits preferably the invention is practiced in conjunction with certain additional features or characteristics.

In particular, preferably the device further includes a stored software routine for forming a proofing file from input image data. Another preference is that the device further include a device for forming a visible proof from a proofing file.

In preferred embodiments of its fourth major independent facet or aspect, the invention is a system for remote proofing, using a proofing file transmitted from a generator to a receiver of the file. The system includes processor components operating a program to automatically determine whether such generator and such receiver are both within a common intranet.

The system also includes processor components operating a program to transmit such proofing file to such receiver. These components in turn include:

processor components operating a program to automatically route the transmission substantially wholly within the intranet, if such generator and receiver are both within a common intranet; and processor components operating a program to otherwise route the transmission instead at least partially outside any intranet.

The term "otherwise" here means, referring to the previous paragraph: "if such generator and receiver are not both within a common intranet".

The system further includes at least one proofing device reading the proofing file. The proofing device also creates a corresponding visible proof.

The foregoing may represent a description or definition of the fourth aspect or facet of the invention in its broadest or most general form. Even as couched in these broad terms, however, it can be seen that this facet of the invention importantly advances the art.

In particular, this aspect of the invention has the same advantages as the earlier-introduced first aspect, but goes further in that it includes apparatus for reading the transmitted file and forming a proof that people can see, and it specifically includes processor components performing the several functions of transmission testing and control. Such components can be all in a single processor, or can be distributed among two or several different processors; each processor in turn can be an electronic processor, or an optical processor, or any other type of processor known now or in the future.

As an example, if an electronic processor is employed it can be a general-purpose processor operating in a general-purpose computer; or for example in a dedicated computing module in a proof printer, or in a raster image processor ("RIP") associated with a proofing system—or in fact in any conveniently established computing environment related to the remote proofing system. In any of these cases the program may be established as software, or as firmware held in a read-only memory ("ROM") or other type of memory and associated with a proofing device.

Furthermore the processor may be an application-specific integrated circuit ("ASIC"), constructed with the program permanently built into the computing circuits as such. Any of these different types of processors, or parts of them, can be combined with any of the other types—or parts of such other types—as desired, to provide the "processor components" recited above.

Although the fourth major aspect of the invention thus significantly advances the art, nevertheless to optimize enjoyment of its benefits preferably the invention is practiced in conjunction with certain additional features or characteristics. In particular, there are several selectable preferences as to proofing device: the generator can have at least one such device, or the receiver can, or both the receiver and the generator can each have at least one said proofing device.

In the case where the receiver has such a device (or the receiver and generator each have one), a further preference is that the receiver also have automatic processor components operating a program to test color calibration of the proofing device. If so, it is still further preferable that the receiver have automatic processor components operating a program to return—to the generator—results of color-calibration testing.

There are several other preferences related to the basic fourth aspect of the invention:

If the system is particularly for hardcopy remote proofing, it is desirable that the proofing device be a hardcopy proof-printer and the visible proof created by the proofing device be a hardcopy proof. In this case a further preference is that the hardcopy proof-printer be a closed-loop-color device that includes some means for testing accuracy of color in an actual hardcopy printed proof—and, here again, returning test results to the generator.

Selectable preferences as to the determining-program and routing-program processor components are that the generator have these components, or that the receiver have them—or that a master server be present, distinct from the generator and receiver, operating the system to facilitate the transmission, and that this master server have these components; or finally that one of these components be localized in one of these devices and the other in another of the devices.

Another preference involving such a master server is that the alternative proof-file transmission—in other words, the transmission that is necessarily routed at least partly outside any intranet—pass through the master server.

In still another basic preference, the system also includes the generator and the receiver; and the determining program and transmitting program are peer-to-peer software operating between the generator and receiver—and this software is stored in the generator or receiver, or both.

In preferred embodiments of its fifth major independent facet or aspect, the invention is only just a portion of the system that has been described above. Here the invention is a receiver station for interacting with a remote proofing-file generator.

The station includes a proofing device using the proofing file to create a corresponding closed-loop color remote proof. It also includes some means for providing information used in automatically determining whether the generator and the receiver station are both within a common intranet. (For purposes of breadth and generality in discussing the invention, these means will be called simply the "providing means".)

Also included are some means for automatically receiving the proof file from the generator. (Again for generality and breadth, these means will be called the "reception means" or "receiving means".) This receiving of the file is routed substantially wholly within the intranet, if the generator and receiver are both within a common intranet; and otherwise instead routed at least partially outside any intranet.

The foregoing may represent a description or definition of the fifth aspect or facet of the invention in its broadest or most general form. Even as couched in these broad terms, however, it can be seen that this facet of the invention importantly advances the art.

In particular, this aspect of the invention serves the elemental functions required of the receiver, if some forms of the previously described system are to work. An especially expeditious way of facilitating that system is for the receiver station to perform, or alternatively to cooperate in, the necessary threshold step—i.e. determining the basic fact or facts used in the routing decision.

Most commonly this determination or cooperation takes the form of providing an Internet-protocol address ("IP address") to the generator, for comparison with the generator's own address to determine whether an intranet relationship is present. Alternatively the comparison may be performed by the receiver, and results of that comparison then made—whether directly or indirectly—to control the transmission by the generator. The invention is not limited, however, to these particular form of collaboration; for example the receiver may test transmission speed between itself and any of various nodes within the intranet that are available to the generator for use as routing intermediates.

The receiver may collaborate in other ways to establish particular routing options available within the intranet. The receiver may also, or instead, collaborate in testing of transmissions of various sizes routed by way of particular ones of those routing options, to establish ideal routing.

The preliminary exchange of data and decision-making need not itself be conducted through the intranet. It entails no large volume of data transmission, and generally includes no sensitive information—and therefore can if preferred proceed along whatever convenient path is available, in the conventional manner of TCP/IP transmissions.

Among several useful options is passage of the preliminary exchange between the generator and receiver by way of the master server. Thus the master may organize and arrange the transaction, through any available link, and then step aside while the generator and receiver execute it between themselves if possible.

The fifth major aspect of the invention thus significantly advances the art. Nevertheless to optimize enjoyment of its benefits preferably the invention is practiced in conjunction with added features or characteristics.

In particular, in the case that the receiver also interacts with a master server as mentioned above, one basic preference is that the reception means are substantially passive with respect to automatic routing of the file. If this latter preference is observed, then preferably the providing means also provide the information to the master server—and if this preference too is met, then preferably the master server at least partially controls automatic routing of the file.

An alternative basic preference is that the receiving means at least partially control the automatic routing. As will now be appreciated, a number of different configurations or modalities can be made to work satisfactorily.

In preferred embodiments of its sixth major independent facet or aspect, the invention is a proofing-file generator station for interacting with a remote proofing-file receiver. This facet of the invention is complementary to the fifth aspect discussed just above.

This station includes some means for providing information used in automatically determining whether the generator station and the receiver are both within a common intranet. As before, this information provision can take any one or more of a great variety of forms.

Such forms may range from simple determinations based on IP addresses, through the kinds of active collaborations mentioned above for the receiving station, to even more sophisticated or elaborate provisions for active establishment of optimum routes. Such further provisions are well within the ordinary skills of network design, optimization and maintenance.

The generator station also includes some means for automatically transmitting (thus, "transmitting means") the proofing file to the receiver. As before, the transmission is routed substantially wholly within the intranet, if the two stations are both within a common intranet, and otherwise instead at least partially outside any intranet.

The foregoing may represent a description or definition of the sixth aspect or facet of the invention in its broadest or most general form. Even as couched in these broad terms, however, it can be seen that this facet of the invention importantly advances the art.

In particular, this aspect of the invention represents an alternative, equally tractable, to the fifth aspect. (Only one of the stations—either one—can make the routing decision alone; and either station alone can initiate the transmission, too. Accordingly information necessary to support the decision need not be passed in both directions; just one is sufficient. The invention is readily capable, however, of functioning very well in a more highly shared or collaborative decision-making mode, as indicated above, in which for example each station transmits necessary or useful data to the other, or the two stations' respective decisions can be compared as verification.)

Although the sixth major aspect of the invention thus significantly advances the art, nevertheless to optimize enjoyment of its benefits preferably the invention is practiced in conjunction with certain additional features or characteristics. In particular, alternative basic preferences are that the transmitting means (1) be substantially passive with respect to automatic routing of such file; or (2) at least partially control automatic routing of the file. Another basic preference is that the receiver at least partially control automatic routing of such file.

Yet another basic preference, relative to the sixth facet of the invention, is applicable when the generator station is also specifically known to be intended for interacting with a master server that facilitates proofing-file transmission. In this case, preferably the providing means further include some means for providing the information to the master server. When this basic preference is observed, then it is further preferable that the master server at least partially control automatic routing of the file.

In preferred embodiments of its seventh major independent facet or aspect, the invention is a method of remote proofing. One step in this method is automatic determination of whether a proofing-file generator and an intended proofing-file receiver are both within a common intranet.

Another step is the generator's automatic transmission (in other words, automatic transmission by the generator) of a proofing file to the proofing-file receiver. The proofing file is transmitted for use in operating a proofing device to create a visible proof.

In this method, if the determination step shows the generator and receiver are both within a common intranet, then the transmission is automatically routed substantially wholly within the intranet. Otherwise, the transmission is instead automatically routed at least partially through the Internet or another generally available network.

The foregoing may represent a description or definition of the seventh aspect or facet of the invention in its broadest or most general form. Even as couched in these broad terms, however, it can be seen that this facet of the invention importantly advances the art. In particular, this aspect of the invention represents (particularly in combination with the preferences introduced below) a more-detailed form of the first aspect discussed above.

Preferably the determination step includes establishing IP addresses for both the generator and the receiver; and comparing the established IP addresses. If a method complies with this first basic preference, then two alternative subpreferences are that the establishing step include either (1) actively testing a current network address for at least one of the generator and receiver; or (2) consulting a preexisting, substantially static tabulation of IP addresses for at least one of the generator and receiver.

Selectable basic preferences are that the automatic determination step be performed by the proofing-file generator, or by the proofing-file receiver, or by a master server that is distinct from both the proofing-file generator and receiver. In this last-mentioned case, it is still-further preferable that the automatic transmission not pass through the master server; however, in this case it is yet-further preferable that administrative data about the transmission pass to or through the master server. (The administrative data typically are orders of magnitude smaller than the automatic transmission of the proofing file itself.)

Another basic preference is that the method further include the step of the receiver's automatically testing color calibration of the proofing device. In this event it is additionally preferred that the testing step include automatic proofing of an image, and automatic measuring of colors in the proofed image.

If this additional preference is implemented, then subpreferences include that the proofing step include proofing a standard color-calibration chart—or alternatively that it include proofing at least a portion of an image represented in the proofing file, while the measuring step includes measuring at least said proofed image portion. Yet other subpreferences are that the receiver automatically return, to the generator, results of the testing step; and—particularly for remote hardcopy proofing—that the proofing step be performed as part of operating the proofing device to create a hardcopy proof.

Additional basic preferences are that the other generally available network be a private network available for a fee; and—particularly in hardcopy proofing—that the transmission step provide the proofing file for use by the receiver in operating a hardcopy printing device to create a hardcopy proof.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

1. Another Look at the Remote Proofing Service Environment

As is nowadays very familiar, the most-typical single user A" (FIG. 1) can have a computer 44—or station in a remote-proofing service—that is simply attached directly to the Internet 43. Such a user might be, but is not necessarily, associated with a company A".

Figure 1:
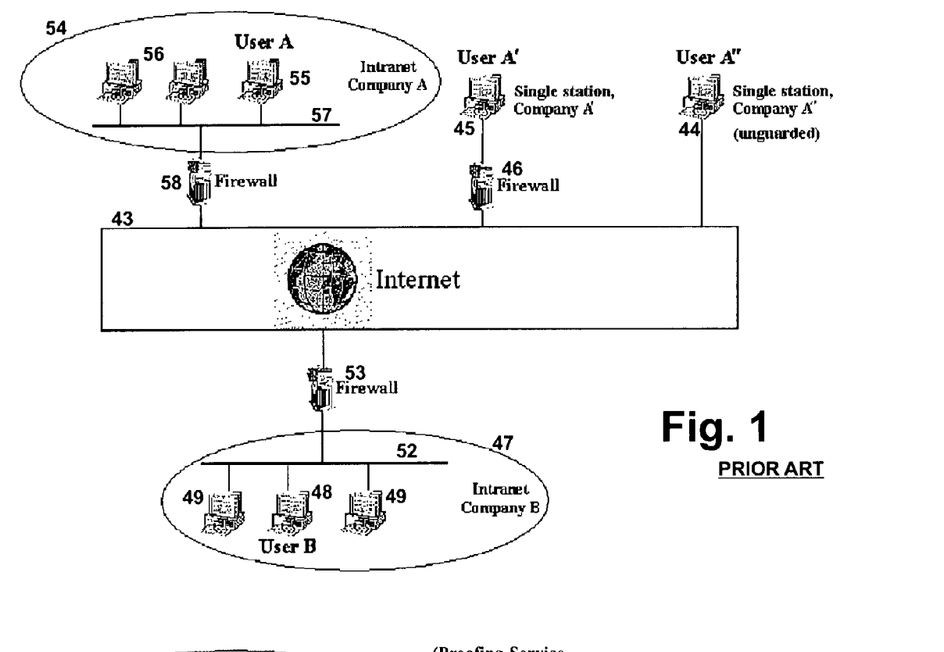
FIG. 1 is a diagram, highly schematic, of conventional interrelationships between various file-transmitting and -receiving entities, and the Internet.

Classically a computer 44 was simply attached to the Internet 43 by an electrical or optical modem (not shown) with no intermediate computing stage; however, more modernly this attitude of trust has been changing—due to increased levels of malicious behavior by many Internet users. Such behavior includes aggressive hacking (often intrusive or compromising, and sometimes destructive), and also circulation of computer viruses and worms.

As a result it is becoming much more common for a representative user A' to guard his or her computer 45 by a protective intermediary termed a "firewall" 46. The firewall is sometimes simply software running in the same system, but a more effective arrangement uses another, dedicated computer. In either event the firewall inspects messages and materials that are incoming—i.e. approaching the computer 45 from the Internet 43—and attempts to intercept and deny entry to harmful files, probes and processes.

Interestingly, such systems are usually set up so that the firewall 46 is transparent to outgoing materials. Accordingly a typical firewall offers no obstruction and in fact applies little or no substantial modification to outbound data, regardless of the IP address to which it is directed.

A firewall 53, 58 is even more commonly found—actually almost universal—when a user B, A is part of a respective company that has multiple users 48–49, 55–56 sharing a data bus 52, 57 in an intranet 47, 54. There are several reasons for this greater frequency of firewall use by multiuser companies.

First, a single firewall 53, 58 is typically able to serve traffic from multiple stations 48–49, 55–56 respectively. Hence the cost of firewall apparatus and maintenance can be amortized over a few or many workstations.

A second reason is that the aggregate worth of information in workstations operated by many users is typically many times the worth of data from a single user. A third reason may be that an organization, more typically than a single-user business, has at least one member who considers data integrity or secrecy very important.

Figure 2:
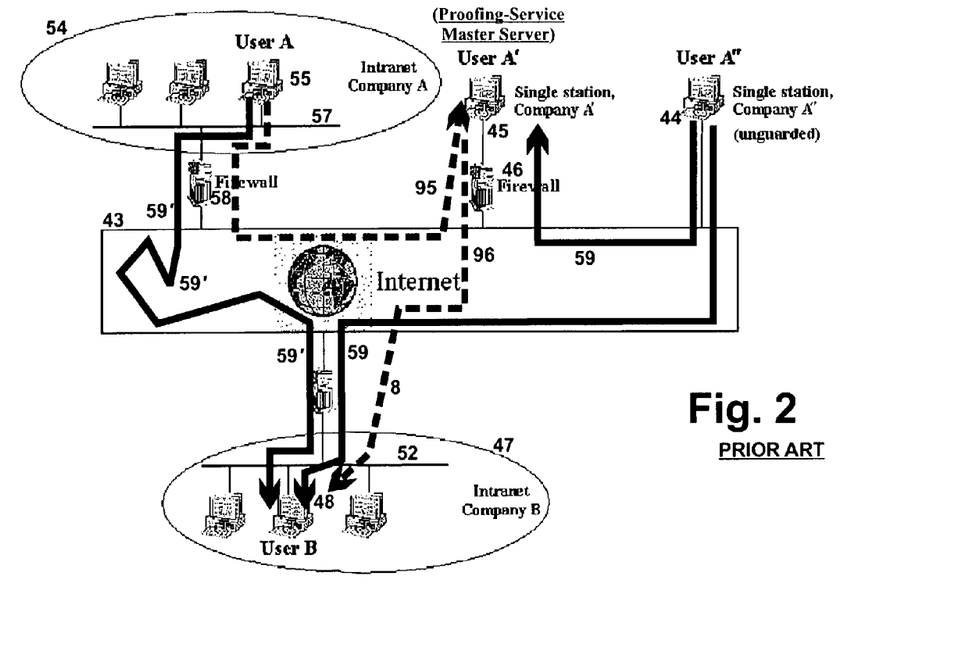
FIG. 2 is a copy of the same diagram with added notation of conventional file-transmission paths through the Internet.

At any rate, user A, B has a respective computer 55, 48 that shares the firewall 58, 53 with other users 56, 49 in the same organization—i.e. in Company A, Company B respectively. With this in mind, any user A, A', A", B is able to transfer files and is able to direct processes to any other user: the data pass via the Internet 43 along paths 59, 59' (FIG. 2).

A path 59' through the Internet is seldom direct, as data are routed from a sender to the sender's ISP, then to the recipient's ISP and then to the recipient. More commonly at least one and sometimes several other intermediate nodes are automatically selected and traversed along a route 59' that in some cases becomes quite convoluted.

Data paths considered up to this point apply to messages in general, and remote proofing-file transmissions in particular, as between two users of different companies and operating individual stations 44, 45, or in different intranets 54, 47. Sometimes the two users are in different countries or continents. The Internet is most often the only link between the two intranets, although another possibility is a private point-to-point link, e.g. such as is sometimes leased to telecommunications companies.

For remote proofing-file transmissions, considering User A' to represent a master server of the remote proofing service itself, conventionally proofing files from User A to User B proceed along a path 95, 96 (shown in the dashed line) via that master server. In other words, proofing files pass along a route 95 from User A to User A', and then from User A' to User B along a route 96.

Within a common intranet 47, 54, or 354 (FIG. 3), however, e-mail and FTP transmissions etc. can pass directly between two users 48–49, 55–56, 355–355' on a common data bus 52, 57, 357. Conventionally such strictly-local transmissions 359 (FIG. 3) are not guaranteed to occur, and the data from a sender 355 may instead pass out 359', 359" into the Internet 43 and then back in to the recipient 355'.

Figure 3:
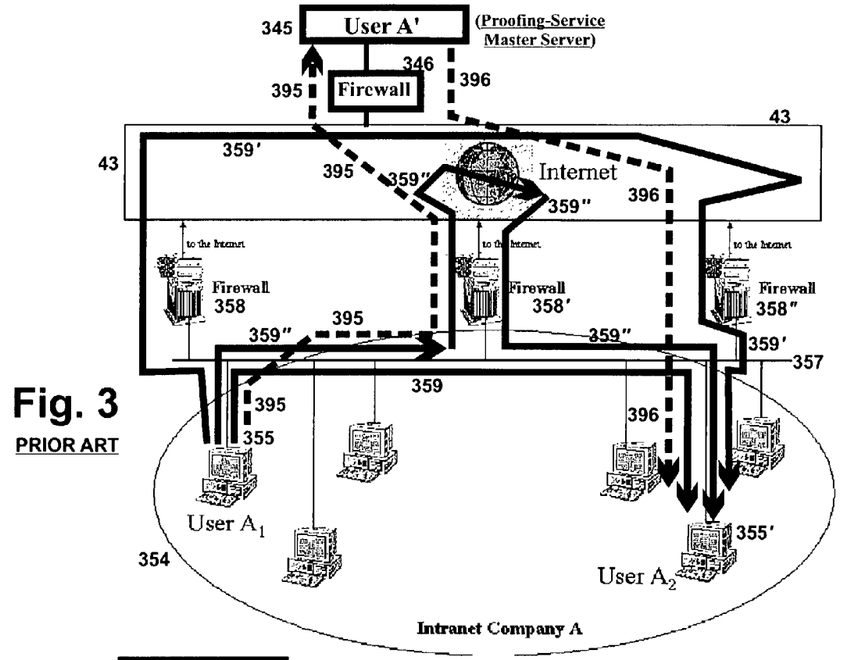
FIG. 3 is a diagram like FIG. 2 but showing only entities that are all in a common intranet, with that intranet assumed to be all within a relatively limited geographical area—e.g., on the same continent.

This can be avoided if the user at an originating station (1) knows that the recipient is in the common intranet, and (2) either knows how to address the recipient by an intranet address or in some other way specifically instructs the system to transmit entirely within the intranet 47, 54, 354.

(Of course there is an exception to these requirements if the intranet 354 is the only transmission option, i.e. if there is no access to the Internet at all. Such very limited systems are not related to the present invention, and are outside the scope of this discussion.)

If no specific manual within-the-intranet addressing or instruction is provided, then for e-mail and FTP transmissions in general the routing—as between paths 359, 359', 359"—in many or most cases is essentially left to chance. For transmissions of proofing files, related to operation of a remote proofing service, such chance events are much less important than the conventional routing 395–396 (shown in the dashed line) of proofing files through the master server 345.

Even though a single firewall can serve many stations, typically an intranet 354 of a large company—particularly but not only one that is widely dispersed geographically—has several different firewalls 358, 358', 358" (FIG. 3). These are most usually connected to the Internet in parallel, at different geographical points.

2. Undesirable Operation of the Conventional Systems

Thus the inventors have noted that information addressed by a user $A_1$ to a user $A_2$ within the same intranet 354—but addressed using an ordinary TCP/IP address—may possibly flow from the sending station 355:

on a path 359 directly along the intranet bus 357 to the recipient station 355'; or out through a geographically nearby firewall 358 into the Internet 43, along a path 359' through the Internet, and back through another firewall 358" that is geographically near the recipient station 355'; or even out through any exit firewall 358' into the Internet 43, and sometimes—after passage along a circuitous path 359" within the Internet—back through any firewall, possibly even the same firewall as the exit 358', and then eventually to the recipient station 355'.

Only the first path 359, as explained earlier, is a desirable one for optimum speed and security. In a significant number of cases, however—more likely when the two users $A_1, A_2$ are far from each other—the data will follow paths 359' and 359" that needlessly and disadvantageously pop in and out of the Internet.

Here too, however, these statistical happenings are not controlling in the special case of participation in a remote-proofing service. In this case conventionally the data are virtually certain to pass through the Internet, since proofing data usually flow 395–396 (FIG. 3) between the sending station 355 of User $A_1$ and the receiving station 355' of User $A_2$ by way of a master server 345, of User A'.

When the two user stations 455, 455' (FIG. 4) are separated very widely, as for instance on different continents, the likelihood of routing 459 through the Internet 43—or, as mentioned above, a private link (not illustrated)—becomes particularly high, and the chance of automatic passage directly along an intranet system bus 457 is relatively low. Almost all intranets give users the option of manually commanding the system to use all-intranet routing, but as noted above this requires knowledge that the recipient is on a common intranet, and knowledge of a procedure for making the command.

Figure 4:
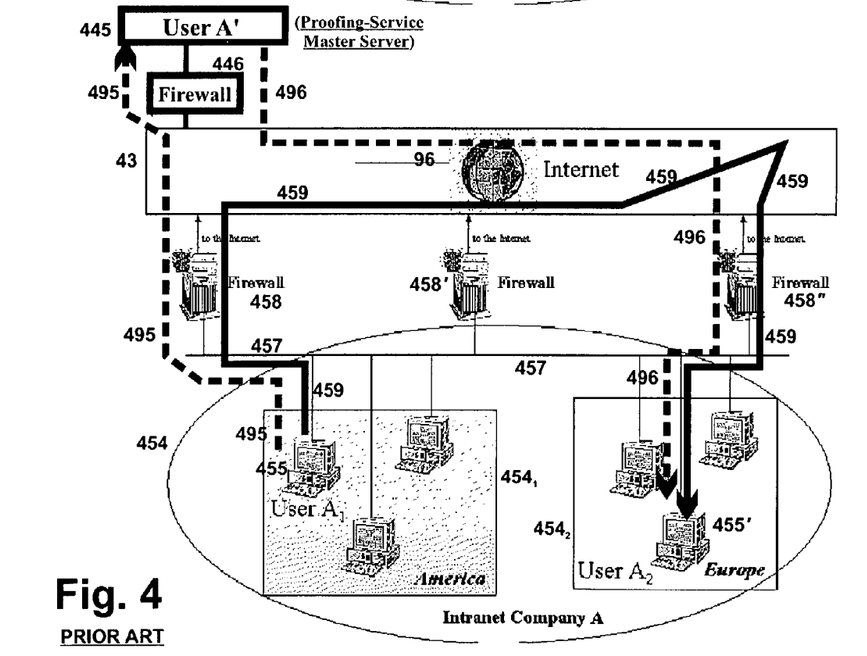
FIG. 4 is a like diagram but showing only entities in a common intranet that spans extremely remote distances, e.g., two continents.

Although two user stations 455, 455' are in different countries and continents, they are behind the firewall; therefore, to share data it is not necessary for them to use the Internet. Nevertheless most users, in most situations, lack some of the needed knowledge or concern about the routing—or both.

Once again, however, in the remote-proofing case the use of the Internet is not usually controlled by chance. Here what ordinarily controls is the conventional requirement for proofing files to pass along a route 495–496 via the proofing service master server 445.

In most such arrangements the full implications of the terms "intranet" and "firewall" are applicable. That is, the entire company has its own physical data-transmission lines (whether optical fiber or electrical wires) or at least rents data capacity on a private network that provides shared lines.

In some geographically dispersed companies, on the other hand, the word "firewall" is used in a more-figurative sense, as data may actually pass through the Internet along part of its route—but with automatic long-key strong encryption for privacy. These systems enjoy only some of the full benefits of a physically separate intranet. Nevertheless it remains highly preferable to enjoy at least those benefits.

3. Eliminating Undesired Operations when Possible

In all such systems, whether users $A_1$, $A_2$ within their common intranet 354, 454 are nearby or remote, preferred embodiments of the invention provide rapid and private transmission of proofing files along routes 359, 559 (FIGS. 5 and 6) substantially entirely within the intranet. The proofing-service master servers 345, 445 remain in existence, but the proofing files simply bypass them—thus implementing the overall goal of minimizing the path (or at least the Internet path) through which the data are transmitted.

Figure 5:
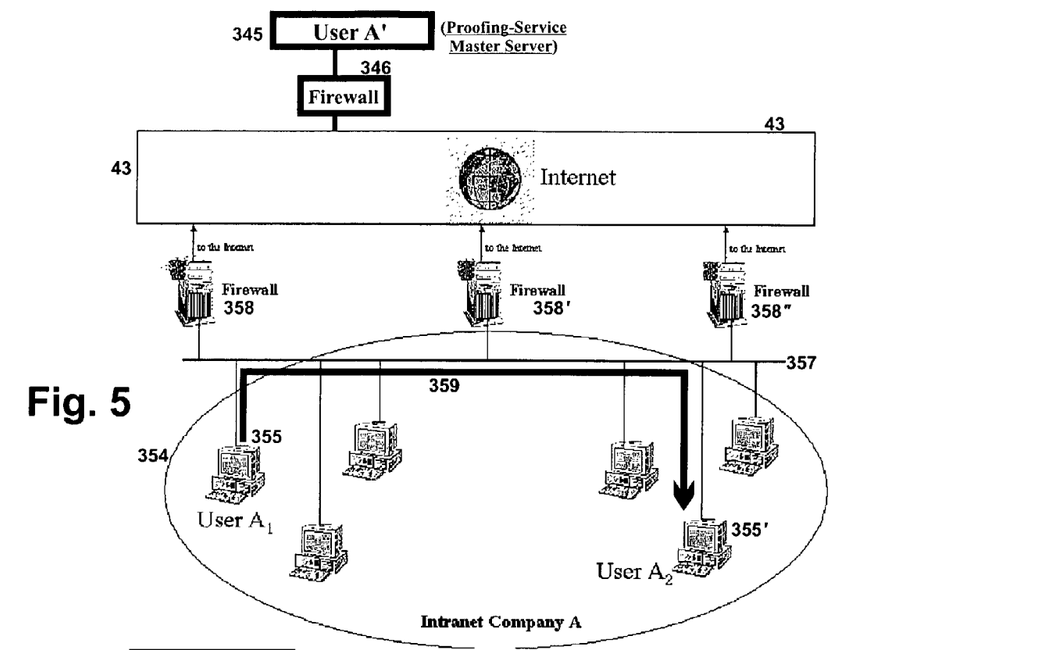
FIG. 5 is a diagram analogous to FIG. 3 but showing a file-transmission path restricted according to preferred embodiments of the invention, i.e. with other conventional paths prohibited.
Figure 6:
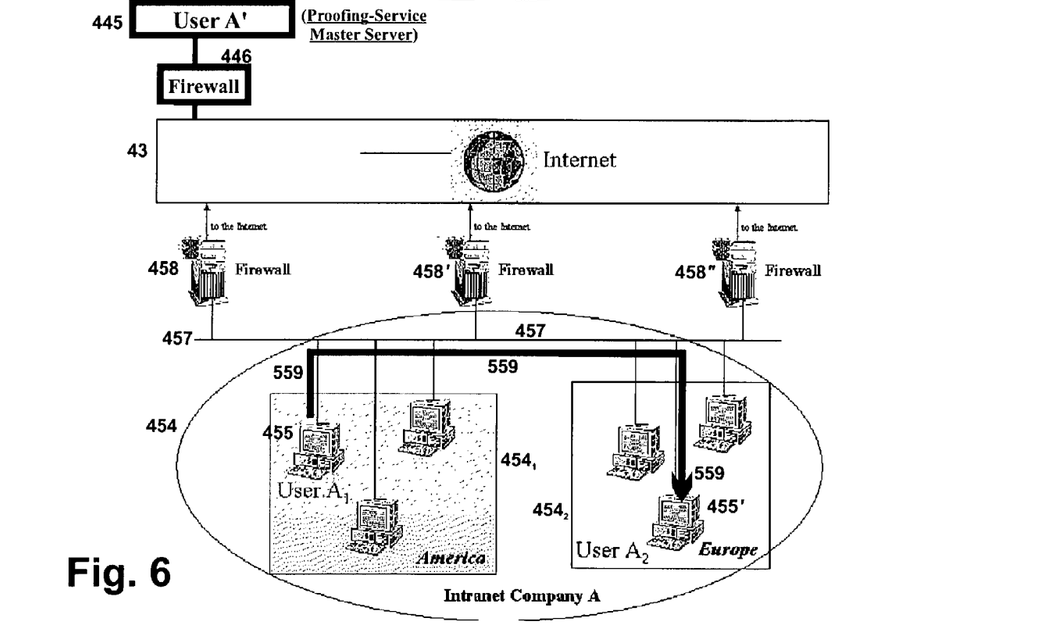
FIG. 6 is a diagram analogous to FIG. 4, but—as in FIG. 5—showing a file-transmission path restricted according to preferred embodiments.

This is accomplished by automatically checking for common-intranet addresses, and if present then automatically routing the transmission entirely through the intranet. The invention supplies the previously mentioned differentiation—between users of networks generally and users of common intranets specifically—that is missing in conventional systems.

This decision-making need not be worked out in advance, e.g. tabulated for later reference. Instead the routing decision can be, and preferably is, made both dynamically and automatically, with software that is general for use in any kind of web-type network—unlike the predetermined or manual arrangements, configured particularly for LANs, taught in the Holub patents discussed above.

While the large proofing files bypass the Internet and thereby the master server 345, 445, this is not necessarily true of compact administrative communications that are associated with the proofing files. Such small messages can be routed through the master server, or through the Internet generally—or may follow the path of the proofing files—as preferred.

Thus the invention provides an optimum arrangement for transmitting files between two users in each one of the illustrated scenarios—optimizing transmission performance and improving security, particularly for a network-based remote proofing service. When users $A_1$ and $A_2$ are inside the same intranet, a proofing file is transmitted between them using a peer-to-peer connection within the intranet, without going beyond the firewall, and without exposing the data to the external Internet.

Representative intranet connections operate at up to a hundred megabits per second, whereas Internet connection speed for a modem-based user is often measured in kilobits—i.e. roughly three or more orders of magnitude slower. File transmissions using an intranet infrastructure are therefore completed in far less time than using the Internet.

Furthermore the possibilities of success are higher, because of the higher reliability of typical intranets. Internet failures during a protracted connection are all too common.

The path traversed by the data is the shortest path between the two users, because the "network distance" between them is smaller if all the links are established within the intranet.

When sender and receiver are in different intranets, or when one or both are in no intranet, the file transmission is routed via the Internet (or private network ASP if preferred) using a peer-to-peer connection or using the remote proofing servers as intermediaries. This is the best that can be done under the circumstances; the invention does not make this case any worse.

(Peer-to-peer connection is not always available. If a restrictive firewall is below one or both of the prospective peers, operation through the remote proofing server or servers may be the only practical option.)

4. System Implementing the Invention

Sending and receiving stations 10, 110 (FIG. 7) advantageously are identical except for limited programming differences that reflect their respective functions as senders and receivers. (Their near-identical character is suggested by outline shapes in the drawings.)

Figures 7, 9:
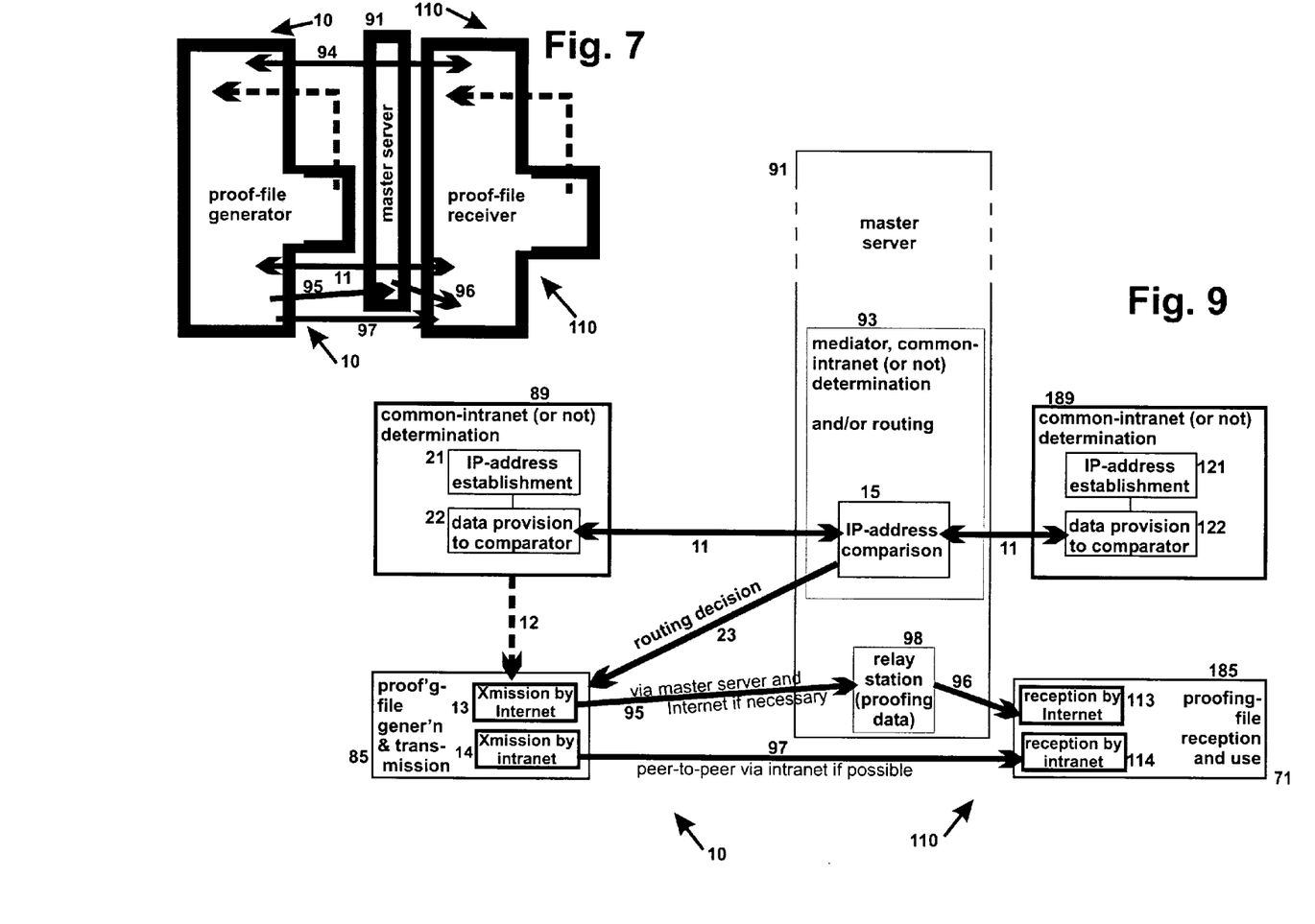
FIG. 7 is a very high-level block diagram of a hardware system according to preferred embodiments of the invention—and particularly intended to help orient the reader to the overall structural layout of FIG. 8.
FIG. 9 is a like representation, drawn somewhat enlarged, of certain key elements of FIG. 8.

In one preferred embodiment, the proofing-service master server 91 acts as mediator between the two stations 10,110—for purposes of preliminary negotiation about subsequent data routing, i.e. peer-to-peer intranet paths vs. server-linked Internet paths. This mediation function, however, is not required by the invention.

In fact the machines advantageously carry software to perform the preliminary negotiations, too, on a peer-to-peer basis, if preferred. Other administrative tasks as well can be handled either way, within the scope of most of the appended claims.

Several data paths are advantageously established between the three main modules (sender 10, receiver 110, and master 91). These paths include:

negotiations 94 over color-calibration transmission or reception, and evaluation of those exchanges;

negotiations 11 over routing (via common intranet or not), and the data exchanges needed to establish the routing; and actual proofing-file transmission 95–96 or 97, by way of the master or by way of an intranet, respectively, as the case may be.

These relationships are discussed below in considerably greater detail, but with reference to the same overall diagrammatic layout. Before discussing the novel features of the system, this section introduces the partially conventional infrastructure.

Preferred embodiments of the invention operate in a master server 91 (FIGS. 7 and 8) and a pair of printers or stations 10, 110 that are generally identical—the principal exception being the active part of programming for one or more associated microprocessors. Ordinarily the totality of the stored programming in both printers/stations is identical, so that each station can assume either of the two roles (originator and receiver). In any given relationship between two stations, different parts of the available programming are activated to establish distinct complementary functioning.

Figure 8:
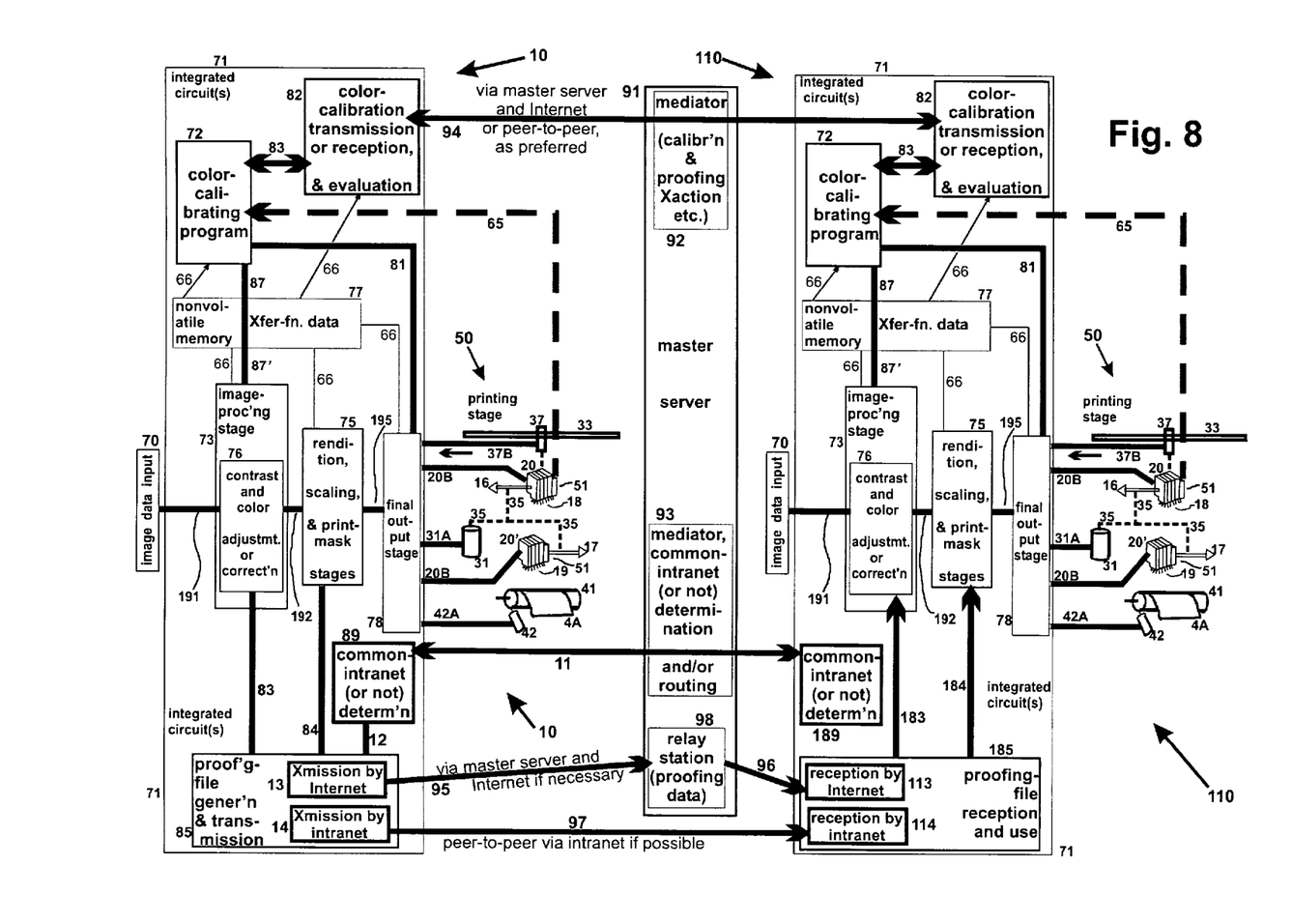
FIG. 8 is a diagrammatic representation, highly schematic, of a hardware system according to preferred embodiments of the invention.

Each of the two printers/stations includes a print engine 50, and integrated circuits 71 operating programs to provide an associated computing capability which includes a printer driver 72–78. The circuits 71 most commonly take the form of a dedicated processor in a proofing printer, coupled with a general-purpose processor in a general-purpose computer, and often or usually also coupled with a raster-image processor—but also with an application-specific integrated circuit ("ASIC") included for repetitive specialized tasks.

For purposes of this invention, use of any of these processor types—and any combination of all or some—is substantially interchangeable. Accordingly the allocation of computing capability as among these various types is omitted from the accompanying illustrations.

Typically, however, image data 70 (FIG. 8) after loading (or generation) reside in the computer—most usually in some graphics application program. Often these data are partly developed or refined in the driver. The hardware that particularly implements the routing decisions, and data collection supporting those decisions, is most typically a microprocessor and memory residing in the printer.

In the print engine 50, a scanning carriage assembly 20 is driven in reciprocation by a motor 31, through the intermediary of a drive belt 35. The motor 31 is under the control of signals 31A from the output stage 78 of the programmed circuitry 71.

In the block diagrammatic showing, the carriage assembly 20, 20' travels to the left 16 and right 17 respectively while discharging ink 18, 19. (The two showings 20, 20' represent the same, single carriage when moving in its two scan directions respectively.)

A very finely graduated encoder strip 33 is extended taut along the scanning path of the carriage assembly 20, 20' and read by an automatic optoelectronic sensor 37 to provide position and speed information 37B for the microprocessors 71. (In FIG. 8, signals in the print engine are flowing from left to right except the information 37B fed back from the encoder sensor 37—as indicated by the associated leftward arrow.)

The codestrip 33 thus enables formation of color inkdrops at ultrahigh resolution (typically at least 24 pixels/mm) and precision, during scanning of the carriage assembly 20, 20' in each direction. The encoder sensor 37 is disposed with its optical beam passing through orifices or transparent portions of a scale formed in the strip 33.

A cylindrical platen 41—driven by a motor 42, worm and worm gear under control of signals 42A from the processors 71—rotates under the carriage-assembly 20 scan track to drive sheets or lengths of printing medium 4A in a medium-advance direction perpendicular to the scanning. Print medium 4A is thereby drawn from a roll, passed under the pens on the carriage 20 to receive inkdrops 18, 19 for formation of a desired image, and ejected from the printing stage 50.

The carriage assembly 20, 20' carries various electronics, and includes bays for preferably four or six pens holding ink of four different colors respectively—preferably at least cyan, magenta, yellow and black, and advantageously also dilutions of at least the cyan and the magenta.

The pens all are relatively long and all have nozzle spacing equal to one-twelfth millimeter—along each of two parallel columns of nozzles. These two columns contain respectively odd-numbered and even-numbered nozzles.

The two columns have a total of one hundred fifty nozzles each, and are mutually offset vertically by half the nozzle spacing, so that the effective pitch of each two-column nozzle array is approximately one-twenty-fourth millimeter. The natural resolution of the nozzle array in each pen is thereby made approximately twenty-four nozzles (yielding twenty-four pixels) per millimeter, or 600 per inch.

Preferably black (or other monochrome) and color are treated identically as to speed and most other parameters. In the preferred embodiment the number of printhead nozzles used is always two hundred forty, out of the three hundred nozzles in the pens.

This arrangement allows for software/firmware adjustment of the effective firing height of the pen over a range of ±30 nozzles, at approximately 24 nozzles/mm, or ±30/24=+ 1¼ mm. This adjustment is achieved without any mechanical motion of the pen along the print-medium advance direction.

Alignment of the pens can be automatically checked and corrected through use of the extra nozzles. As will be understood, the invention is amenable to use with great variation in the number of nozzles actually operated.

At an input point 191 of the circuitry 71, image data 70 enter an image processor 73—which provides adjustment or correction 76 of color and contrast. The corrected or adjusted data 192 proceed next to printer-specific preparation stages 75 for rendition, scaling and print-masking.

The latter stages 75 feed pass-separated inkdrop data 195 to the final output stage 78. That stage responds with relatively low-impedance electrical pulses 20B to drive the individual nozzle heaters, 31A to operate the scan motor 31, and 42A to operate the print-medium advance motor 42—thereby printing onto the medium 42A a hardcopy approximation of the image for which data 70 were first introduced.

Early inkjet printers operated on an open-loop basis with regard to color. Each printer was manufactured and adjusted at the factory to produce color according to pre-established relationships with the input image data. Some more-recent printers and printer-plotters include closed-loop color calibration subsystems—simply to enable users to have some feeling for the predictability and accuracy of printed color images.

That first generation of printers accordingly included a color sensor 51 mounted to the pen carriage 20, 20' and thereby capable of traversing the printed image (whether a picture of interest or a test pattern). Optical data 65 from the sensor 51 pass to an interpretive module 72 in the programmed circuitry 71, generating a color transfer function 87 that characterizes the entire driver and engine.

Related transfer-function data are stored in nonvolatile memory 77 in the printer, and an inverse function 87' is directed to the front-end processing stage 73 discussed earlier. This function is there applied in such a way as to nominally close the color-control loop, within each printing machine.

(The same nonvolatile memory 77, or separate memory banks as preferred, also provide program data 66 to operate programs in other modules of the system. These data typically include operating parameters as well as basic program steps.)

Information 81 from the interpretive module 72 also flows to the final output stage 78, so that the output stage can operate in proper accordance with its current role. The output stage 78 functions somewhat differently for a first raw calibration—e.g., operating as an uncalibrated open-loop system to be characterized—than when it is an already-calibrated closed-loop system that should be at least very nearly linear and accurate.

This calibration function acquires a far greater importance in the current generation of printers intended for remote hardcopy proofing. In this context, color accuracy and particularly uniformity are crucial to the intended function of a proof—i.e., showing printing-industry customers exactly how a color publication will appear when printed in large quantities.

That is to say, in this environment it is no longer sufficient merely to close the color loop nominally. Now calibration must be fine enough to ensure a commercially acceptable color match between two hardcopy printouts produced by two printing machines in two entirely different, mutually remote locations.

These machines therefore provide another layer of loop-closing function, which takes the calibration accuracy to—in effect—a higher order. Now the transfer function or other calibration-characterizing information 83 pass to a remote-intercomparison module 82 for transmission or reception 94 to or from, respectively, another machine of the same type (preferably of the identical product line, for best comparison)—a machine operating in a complementary manner on the same commercial project.

In at least one of the two machines the intercomparison module 82 performs an evaluation of the calibration data from its opposite number, i.e. from the other machine. If the calibration data from that other machine represented readings from a test pattern, then the correct or ideal signal return is known a priori.

If, however, the calibration data were obtained by scanning the sensor 51 over a printed hardcopy image that is the actual picture involved in a particular commercial project, then in one or both of the machines the comparison module 82 can actually compare the sensor returns for the two hardcopy printouts. Considered together with comparative returns from two test patterns, such comparison enables complementary personnel at the two stations to incisively understand the exact character of any residual color difference between the two printouts.

As will be understood, analogous provisions are available in soft-proofing systems to provide a like degree of confidence in the comparative character of two screen displays. (Soft proofing in general is commonly regarded as addressing color accuracy at a lesser level of precision.)

Since the system under consideration is for remote proofing, a remote proofing file must be generated and transmitted 85 from a particular station 10 to the other station 110, and in that other station 110 must be received and applied 185 for printing. In the sending station 10, the proofing-file generation module can collect information either in a relatively pure image form 83, or as a later, premassaged stage of data 84.

If the first of these choices is adopted, then accordingly in the receiving station 110 the transmitted data are injected 183 back into a corresponding early stage 73, and rendition, printmasking etc. remain to be performed in the receiving station. If instead the latter choice is made, then in the receiving station the data are reinjected 184 in a corresponding later stage 75, and less processing is required in that station.

An underlying objective of this geographically distributive system is to control the routing of the proofing-file transmission, as discussed at length above. This is accomplished by determination 89, 189 of whether the two stations are in a common intranet.

This determination requires, at some level, a comparison 11 of network-protocol addresses or the like, and effectuation of an actual decision as to the availability of a common intranet. This operational decision itself can be made in:
  the sending unit determination module 89, or
  the receiving unit module 189 and transmitted to the sending unit module 89, or
  a corresponding module 93 of the master server 91 and transmitted to the sending unit module 89, or
  two or more of these locations cooperatively or distributively, with the necessary information transmitted to the sending unit module 89 for effectuation.

Results 12 of this determination, however made, are provided to the proofing-file generation and transmission stage 85. This stage implements the decision by actuating either a transmission block 14 for routing 97 through an intranet; or a like block 13 for routing 95, 96 by the Internet (either through the master server 91 as illustrated, or directly peer-to-peer).

Considering the common-intranet determination in somewhat finer detail, advantageously the blocks 89, 189 each include a respective submodule 21, 121 (FIG. 8) for establishing the network-protocol address ("IP address") of the respective station 10, 110. Whichever station or stations will not make the actual, final determination then send the IP address to the station or stations that will make the desired comparison and then the determination—e.g. a so-called "comparator" station.

For instance, the comparator may be the determination block 89 in the generator station; and if this is so then the IP address from the receiver is sent 11 to that determination block 89, and the decision is made there. A routing command 12 then passes from that block 89 to the generation-and-transmission block 85 in that same machine.

Instead the comparator may be a module 15 in the master server 91. If this is so, then a routing command 23 can flow directly from that comparator module 15 to the previously discussed transmission block 85 in the generator station 10—bypassing the previously suggested command path 12.

As still another possibility the comparator may be in the determination block 189 at the receiver. In this case a routing command may pass through the master server (or directly) to the transmission block 85 in the generator 10; or via the determination block 89 and thence to the transmission block 85.

Taking into consideration the possibility of a distributed decision, noted above, it will now be seen that there remain several other possible paths for a routing command. It will also be seen, however, that in simple principle all these are equivalent with respect to effectuation of the decision.

The above disclosure is intended as merely exemplary, and not to limit the scope of the invention—which is to be determined by reference to the appended claims.

What is claimed is:

1. A proofing method for showing how a document will appear upon being reproduced, said comprising the steps of:
  automatically testing whether a proofing-file generator and receiver are in a common intranet; and
  if so, automatically sending a proofing file substantially wholly within the intranet.

2. The method of claim 1, wherein:
  the sending step comprises sending the file to the receiver for use in operating a proofing device to create a visible proof; and if the testing step shows the generator and receiver are not in a common intranet, then the transmission is instead automatically routed at least partially through the Internet or another generally available network.

3. The method of claim 1, wherein:
the proofing-file generator performs the automatic testing step.

4. The method of claim 1, wherein:
the proofing-file receiver performs the automatic testing step.

5. The method of claim 1, wherein:
said other generally available network is a private network available for a fee.

6. The method of claim 1, wherein the testing step comprises:
establishing IP addresses for the generator and receiver; and
comparing the established IP addresses.

7. The method of claim 6, wherein:
the establishing step comprises actively testing a current network address for at least one of the generator and receiver.

8. The method of claim 6, wherein:
the establishing step comprises consulting a preexisting, substantially static tabulation of IP addresses for at least one of the generator and receiver.

9. The method of claim 1, wherein:
a master server, distinct from both the proofing-file generator and receiver, performs the automatic testing step.

10. The method of claim 9, wherein:
the automatically routed transmission does not pass through the master server.

11. The method of claim 10, further comprising the step of:
passage of administrative data about the transmission to or through the master server.

12. The method of claim 1, further comprising the step of:
the receiver's automatically checking color calibration of the proofing device.

13. The method of claim 12, wherein the checking step comprises:
automatic proofing of an image; and
automatic measuring of colors in the proofed image.

14. The method of claim 13, wherein:
the proofing step comprises proofing a standard color-calibration chart.

15. The method of claim 14, wherein:
the proofing step comprises proofing at least a portion of an image represented in the proofing file; and
the measuring step comprises measuring at least said proofed image portion.

16. Proofing software for use in showing how a document will appear upon being reproduced, said software comprising:
a routine for testing whether a proofing-file generator and receiver are in a common intranet; and
a routine, responsive to positive results of the testing, for transmitting a proofing file substantially wholly through the intranet.

17. The software of claim 16, wherein:
the transmission routine is peer-to-peer; and
at least the peer-to-peer transmission routine is loaded into the generator or receiver, or both, before operation of the test routine.

18. The software of claim 17, wherein:
at least the peer-to-peer transmission routine is loaded into the generator or receiver, or both, at a factory which prepares said generator or receiver for an end-user.

19. A device for use in remote proofing to show how a document will appear upon being reproduced, and comprising:
a software routine forming data used in testing whether a proofing-file generator and receiver are in a common intranet; and
a stored telecommunications software routine, responsive to positive results of said testing, for transmitting or receiving a proofing file substantially wholly through the intranet.

20. The device of claim 19, further comprising:
a stored software routine for forming a proofing file from input image data.

21. The device of claim 19, further comprising:
a device for forming a visible proof from a proofing file.

22. A system for remote proofing to show how a document will appear upon being reproduced, using a proofing file transmitted from a generator to a receiver of the file; said system comprising:
processor components operating a program to automatically determine whether such generator and such receiver are both within a common intranet;
processor components operating a program to transmit such proofing file to such receiver; comprising:
processor components operating a program to automatically route the transmission substantially wholly within the intranet, if such generator and receiver are both within a common intranet, and
processor components operating a program to other wise route the transmission instead at least partially outside any intranet; and
at least one proofing device reading the proofing file and creating a corresponding visible proof.

23. The system of claim 22, wherein:
the generator has at least one said proofing device.

24. The system of claim 22, wherein:
the generator has the routing-program processor components.

25. The system of claim 22, wherein:
the receiver has the routing-program processor components.

26. The system of claim 22:
further comprising a master server, distinct from the generator and receiver, operating the system to facilitate said transmission;
wherein the master server has the routing-program processor components.

27. The system of claim 22:
further comprising a master server, distinct from the generator and receiver, operating the system to facilitate said transmission;
wherein said transmission routed at least partially outside any intranet passes through the master server.

28. The system of claim 22:
further comprising the generator and the receiver; and
wherein the determining program and the transmitting program are peer-to-peer software operating between the generator and receiver; and
said software is stored in the generator or receiver, or both.

29. The system of claim 22, wherein:
the receiver has at least one said proofing device.

30. The system of claim 29, wherein:
the receiver has automatic processor components operating a program to test color calibration of the proofing device.

31. The system of claim 30, wherein:
the receiver has automatic processor components operating a program to return, to the generator, results of color-calibration testing.

32. The system of claim 22, particularly for hardcopy remote proofing; and wherein:
the proofing device is a hardcopy proof-printer; and
the visible proof created by the proofing device is a hardcopy proof.

33. The system of claim 32, wherein:
the hardcopy proof-printer is a closed-loop-color device comprising means for testing accuracy of color in an actual hardcopy printed proof and returning test results to the generator.

34. A receiver station for interacting with a remote proofing-file generator, to show how a document will appear upon being reproduced; said station comprising:
a proofing device using such proofing file to create a corresponding closed-loop color remote proof;
means for providing information used in automatically determining whether such generator and the receiver station are both within a common intranet; and
means for automatically receiving such proofing file from such generator, routed:
substantially wholly within the intranet, if the generator and receiver are both within a common intranet, or
otherwise instead at least partially outside any intranet.

35. The receiver station of claim 34, also for interacting with a master server that facilitates proofing-file transmission; and wherein:
the receiving means are substantially passive with respect to automatic routing of such file.

36. The receiver station of claim 35, wherein:
the providing means also provide such information to such master server.

37. The receiver station of claim 34, wherein:
the receiving means at least partially control automatic routing of such file.

38. A proofing-file generator station for interacting with a remote proofing-file receiver, to show how a document will appear upon being reproduced; said station comprising:
means for providing information used in automatically determining whether the generator station and the receiver are both within a common intranet; and
means for automatically transmitting such proofing file to the receiver, routed:
substantially wholly within the intranet, if the generator and receiver are both within a common intranet, and
otherwise instead at least partially outside any intranet.

39. The generator station of claim 38, wherein:
the transmitting means are substantially passive with respect to automatic routing of such file.

40. The generator station of claim 38, for also interacting with a master server that facilitates proofing-file transmission; wherein:
the providing means further comprise means for providing said information to the master server.

41. The generator station of claim 38, wherein:
the transmitting means at least partially control automatic routing of such file.

* * * * *

UNITED STATES PATENT AND TRADEMARK OFFICE
CERTIFICATE OF CORRECTION

PATENT NO. : 7,016,085 B2
APPLICATION NO. : 10/176563
DATED : March 21, 2006
INVENTOR(S) : Manuel Gonzalez et al.

Page 1 of 1

It is certified that error appears in the above-identified patent and that said Letters Patent is hereby corrected as shown below:

In column 1, line 54, delete "corners" and insert -- comers --, therefor.

In column 18, lines 19-20, delete "+1¼ mm" and insert -- ±1¼ mm --, therefor.

In column 22, line 34, in Claim 22, delete "other wise" and insert -- otherwise --, therefor.

Signed and Sealed this

Eleventh Day of August, 2009

David J. Kappos
*Director of the United States Patent and Trademark Office*